US007733057B2

(12) United States Patent
Fuchs

(10) Patent No.: US 7,733,057 B2
(45) **Date of Patent: *Jun. 8, 2010**

(54) REPLACEABLE RECHARGEABLE BATTERY UNIT FOR A POWER TOOL, POWER TOOL, AND CHARGER

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/276,700

(22) Filed: Nov. 24, 2008

(65) Prior Publication Data

US 2009/0072787 A1 Mar. 19, 2009

Related U.S. Application Data

(63) Continuation of application No. 10/562,667, filed on Dec. 28, 2005, now Pat. No. 7,456,609.

(30) Foreign Application Priority Data

Aug. 24, 2004 (DE) ........................ 10 2004 040 922

(51) Int. Cl.
*H01M 10/46* (2006.01)

(52) U.S. Cl. ...................................................... 320/114

(58) Field of Classification Search ................. 320/107, 320/112, 114, 115
See application file for complete search history.

(56) References Cited

U.S. PATENT DOCUMENTS

| | | | | |
|---|---|---|---|---|
| 6,066,938 | A * | 5/2000 | Hyodo et al. | 320/114 |
| 7,456,609 | B2 * | 11/2008 | Fuchs | 320/114 |
| 2001/0017531 | A1 * | 8/2001 | Sakakibara et al. | 320/106 |
| 2005/0161077 | A1 * | 7/2005 | Okabe et al. | 136/258 |
| 2008/0012527 | A1 * | 1/2008 | Zick et al. | 320/112 |

FOREIGN PATENT DOCUMENTS

| | | |
|---|---|---|
| EP | 0 642 203 | 3/1995 |

* cited by examiner

*Primary Examiner*—Edward Tso
(74) *Attorney, Agent, or Firm*—Michael J. Striker

(57) ABSTRACT

A power tool system has a power tool, a replaceable rechargeable battery unit for the power tool, and at least one coupling unit for charging the battery unit while being replaceably connected to the power tool; also a replaceable rechargeable battery unit for a power tool, a charger for charging a replaceable rechargeable battery unit for a power tool, and a power tool with a replaceable rechargeable battery unit are provided.

20 Claims, 3 Drawing Sheets

REPLACEABLE RECHARGEABLE BATTERY UNIT FOR A POWER TOOL, POWER TOOL, AND CHARGER

CROSS-REFERENCE TO RELATED APPLICATION

This application is a Continuation Application of U.S. application Ser. No. 10/562,667 filed on Dec. 28, 2005 U.S. Pat. No. 7,456,609. This application therefore claims the benefit of priority of U.S. patent application Ser. No. 10/562,667 under 35 U.S.C. 119(e) and the subject matter of U.S. patent application Ser. No. 10/562,667 is explicitly incorporated herein by reference thereto.

The invention described and claimed hereinbelow is also described in German Patent Application DE 10 2004 040 922.6 filed on Aug. 24, 2004. This German Patent Application, whose subject matter is incorporated here by reference, provides the basis for a claim of priority of invention under 35 U.S.C. 119(a)-(d).

BACKGROUND OF THE INVENTION

The invention is based in particular on a replaceable rechargeable battery unit for a power tool which is provided for detachable connection to a power tool. For being charged, the replaceable rechargeable battery unit has a coupling unit, formed by charge contacts. The coupling unit is located on a part of the replaceable rechargeable battery unit that can be inserted into a receptacle region of a power tool. Once the replaceable rechargeable battery unit has been inserted into the receptacle region of the power tool, the coupling unit is covered by the housing of the power tool. For charging the replaceable rechargeable battery unit, this unit must be removed from the receptacle region of the power tool and inserted by the insertable part into a charger.

SUMMARY OF THE INVENTION

The invention is based in particular on a replaceable rechargeable battery unit for a power tool having a coupling unit for charging the battery unit.

It is proposed that the coupling unit is provided for charging the replaceable rechargeable battery unit in the mounted state on a power tool. The term "provided" should be understood in this connection to mean in particular designed and/or equipped.

With the embodiments according to the invention, the replaceable rechargeable battery unit can be conveniently charged between uses without having to be removed from the power tool. Nevertheless, in continuous operation of the power tool, it can easily be replaced with another, already-charged replaceable rechargeable battery unit. The embodiment according to the invention is fundamentally applicable to all replaceable rechargeable battery units that appear useful to one skilled in the art, but especially advantageously to replaceable rechargeable battery units whose charging capacity is at least essentially independent of whether the replaceable rechargeable battery unit before being charged was always completely emptied and thus has no so-called "memory effect", as is the case for instance with replaceable rechargeable battery units based on lithium-ion technology, and so forth.

For this purpose, the coupling unit may either be located in a region which is directly accessible or contactable even when the replaceable rechargeable battery unit is in the mounted state on the power tool, and/or it may be located in a covered region and designed for contactless energy transmission.

A power tool with a receptacle region for a replaceable rechargeable battery unit is also proposed, which has a coupling unit that is provided for charging the replaceable rechargeable battery unit, and as a result, again as in the proposed replaceable rechargeable battery unit, convenient charging between uses can be attained. Once again, the coupling unit can be located in a region that despite the mounted state of the replaceable rechargeable battery unit is directly accessible or contactable, and/or it can be located in a covered region and designed for contactless energy transmission.

The coupling unit may be located in various regions that appear useful to one skilled in the art, for instance a rear region facing away from the tool receptacle region, or advantageously in some other region facing toward the tool receptacle region. The term "facing toward" should be understood to mean that the coupling unit is at least closer to the tool receptacle region than to an end of the power tool facing away from the receptacle region. By means of a suitable location, especially convenient coupling of the power tool to a charger, particularly in the machining direction, can be attained.

In a further feature, it is proposed that the replaceable rechargeable battery unit and/or the power tool, which will hereinafter be referred by the combined term power tool unit, has a covering means, which is provided for covering the coupling unit. As a result, the coupling unit can advantageously be protected against becoming soiled and damaged.

If the coupling unit is provided for contactless energy transmission, the covering means can be embodied immovably and can advantageously be embodied integrally with some other functional means, such as a housing part. However, if the coupling unit is provided for energy transmission via a mechanical contact, then especially convenient actuation of the covering means can be attained if the covering means is supported movably, for instance pivotably and/or displaceably. As an alternative to being supported movably, however, it would also be conceivable for the covering means to be detachably joined to the power tool unit.

If the covering means is kept captive on the power tool unit in both its covering position and its release position, then loss of the covering means, especially in a charging operation, can be reliably avoided.

If the covering means is provided for automatic movement into its release position upon a coupling operation to a charger, then additional manipulations by a user can be avoided, and the convenience can be further enhanced.

A charger with a coupling unit is also proposed, which is provided for correspondence with at least one coupling unit of a power tool unit of the invention, and which is embodied in particular as a stand for the power tool. The term "stand" is meant in particular to express the fact that the power tool can be positioned for charging in the charger while being held by its handle, and when it is positioned in the charger it can be removed again via its handle, which is at least essentially freely accessible.

If the charger has a receptacle region into which the power tool can be positioned at least essentially in the machining direction thereof, and in particular is inserted into it, then once again the convenience can be enhanced, especially because in its shape, the power tool is fundamentally designed for movement in its machining direction. However, it is also conceivable for the power tool to be provided, or in other words designed and/or equipped, to be inserted into the charger in the direction other than the machining direction.

It is furthermore proposed that the charger, besides a receptacle region for a power tool of the invention, has at least one receptacle region for a replaceable rechargeable battery unit, as a result of which one replaceable rechargeable battery unit can always be charged during operation of the power tool in parallel with another replaceable rechargeable battery unit, so that particularly in continuous actuation, energy transmission is always assured.

A power tool system with a replaceable rechargeable battery unit for a power tool of the invention and a power tool of the invention is also proposed, as a result of which the components can advantageously be adapted to one another.

BRIEF DESCRIPTION OF THE DRAWINGS

Further advantages will become apparent from the ensuing drawing description. In the drawing, one exemplary embodiment of the invention is shown. The drawing, description and claims include numerous characteristics in combination. One skilled in the art will expediently consider the characteristics individually as well and put them together to make useful further combinations.

Shown are.

DESCRIPTION OF THE PREFERRED EMBODIMENTS

Figure 1:
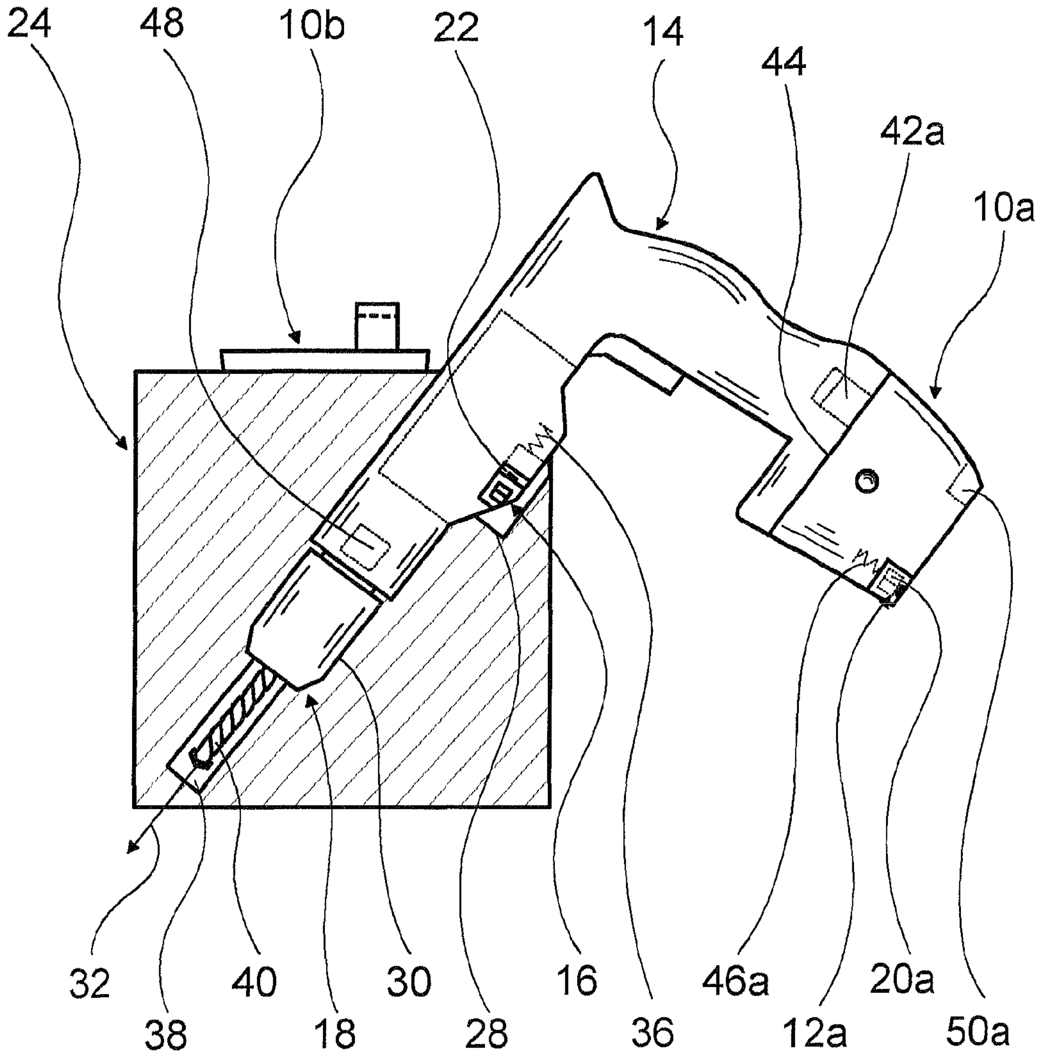
FIG. 1, a first section through a charger in the region of a inserted power tool.

FIG. 1 shows a power tool 14, formed by a pistol-like battery-powered drill. On an underside of the handle, a replaceable rechargeable battery unit 10*a* for a power tool is mounted on the power tool 14 in a corresponding receptacle region 44.

In a front region, facing toward the tool receptacle region 18, the power tool 14 has a coupling unit 16, formed by charge contacts, which is provided for charging the replaceable rechargeable battery unit 10*a*. For charging the replaceable rechargeable battery unit 10*a*, the power tool 14 can be inserted, being held by its handle, in its machining direction 32 into a receptacle region 30 of a charger 24 embodied as a stand. The receptacle region 30 includes a receptacle region 38 for a tool 40 of the power tool 14, so that the power tool together with the tool 40 can be inserted into the receptacle region 30 without having to remove the tool 40.

While the power tool 14 is in operation, the coupling unit 16 is covered by a movably supported covering means 22, formed by a slide, which upon insertion of the power tool 14 into the receptacle region 30 of the charger 24 comes to rest on a stop, not identified by reference numeral, of the charger and which by the insertion motion of the power tool 14 is automatically displaced to the rear into its release position, counter to the machining direction 32, against a spring element 36, so that the coupling unit 16 can come into contact with a corresponding coupling unit 28 of the charger 24. In the state inserted into the charger 24, the handle of the power tool 14 is freely accessible, so that being held by the handle it can conveniently pulled back out of the charger 24 again. On being pulled out, the covering means 22 is displaced by the spring element 36 back forward in the machining direction 32 into its covering position. The covering means 22 is kept captive on the power tool 14 in both its covering position and its release position. In addition or as an alternative to the coupling unit 16, the power tool 14 may also have a permanently covered coupling unit 48, located for instance under the housing of the power tool 14, which is provided for contactless energy transmission and is only suggested by dashed lines in FIG. 1.

The replaceable rechargeable battery unit 10*a* further has a coupling unit 12*a*, which is provided for charging the replaceable rechargeable battery unit 10*a* while the replaceable rechargeable battery unit is mounted on the power tool 14. The coupling unit 12*a* is located at the bottom in a front region pointing in the machining direction 32, of the replaceable rechargeable battery unit 10*a*.

Figure 2:
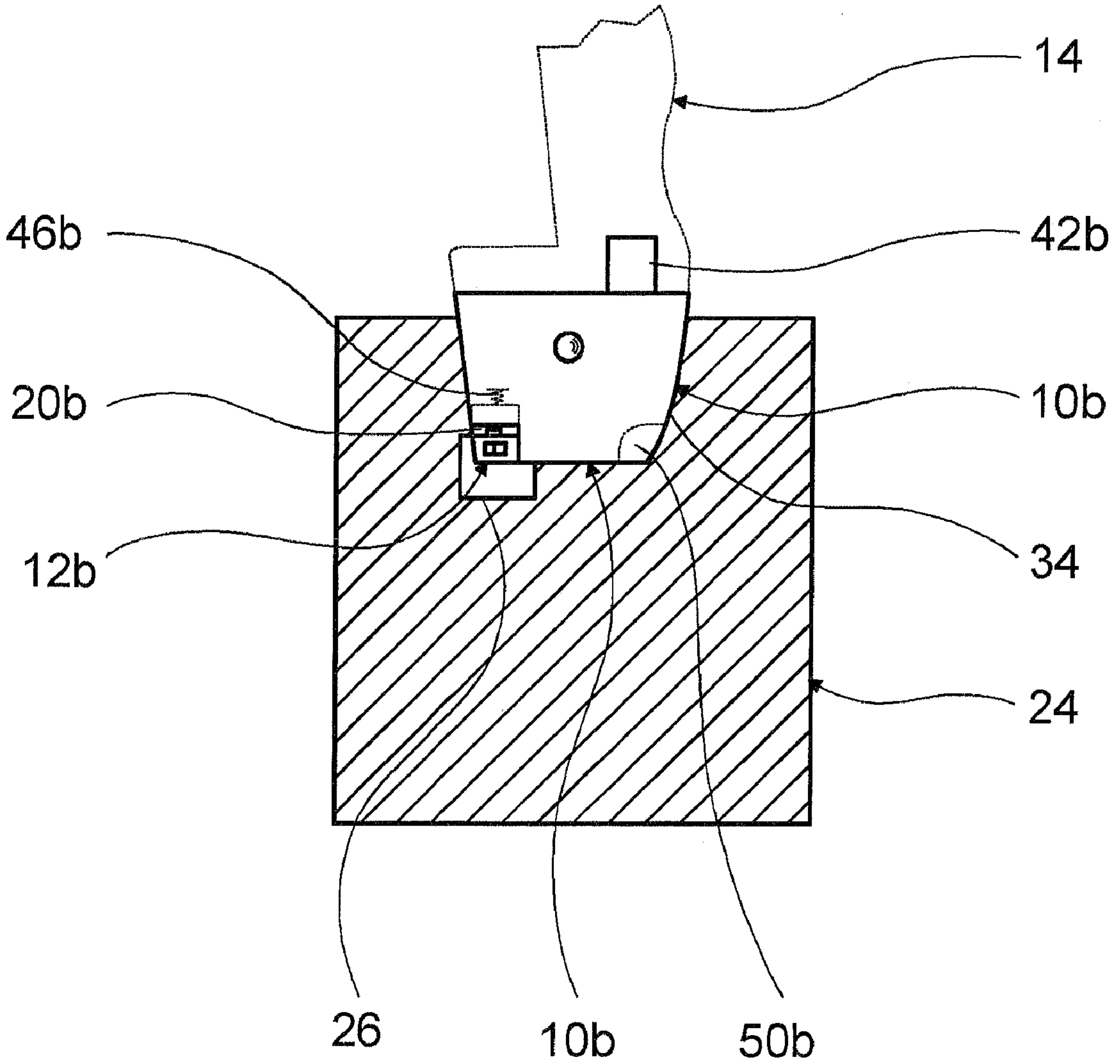
FIG. 2, a second section through the charger in the region of an inserted replaceable rechargeable battery unit for a power tool.
Figure 3:
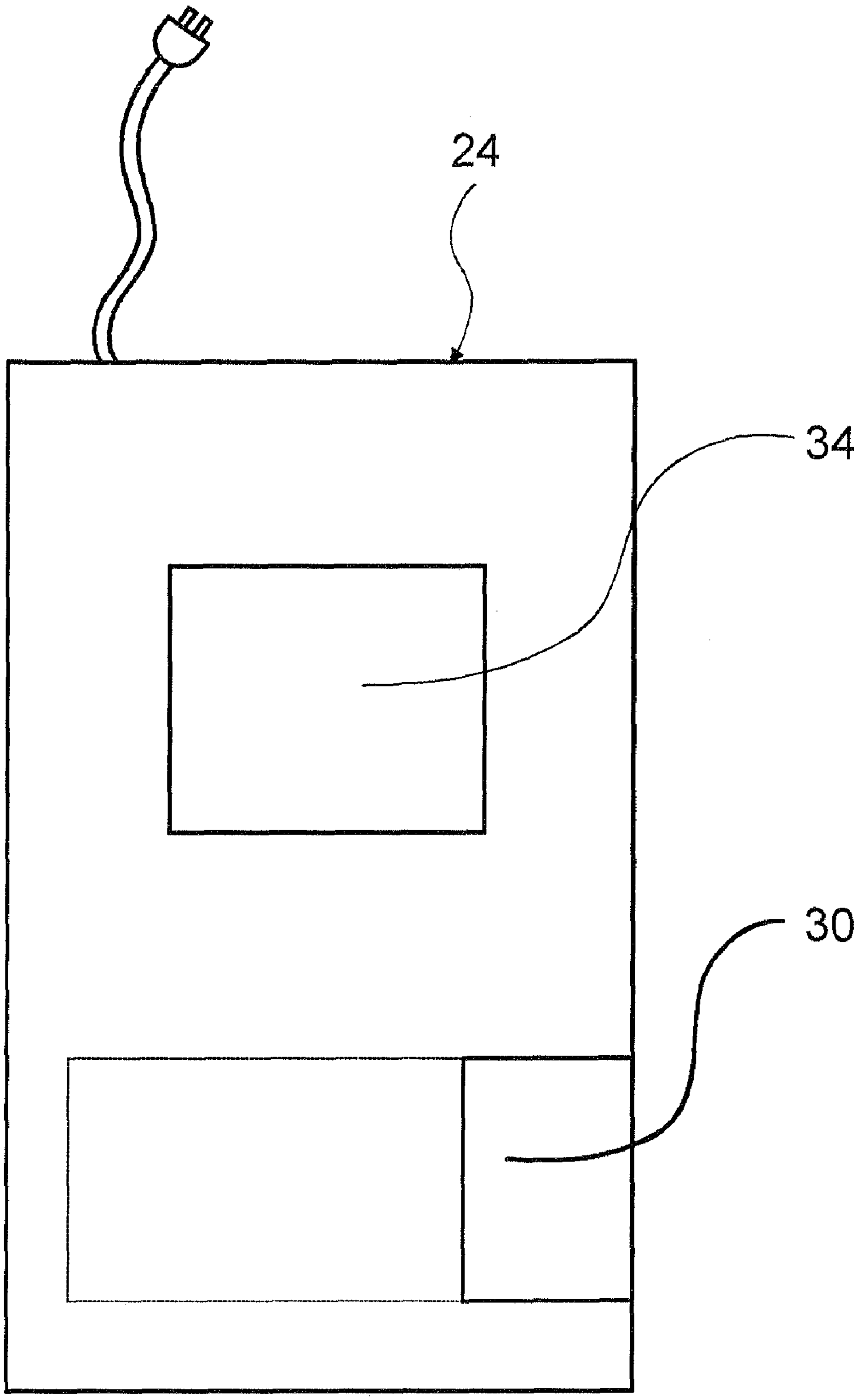
FIG. 3, the charger from above, without the power tool and without the replaceable rechargeable battery unit.

For charging in the mounted state on the power tool 14, the replaceable rechargeable battery unit 10*a* can be inserted essentially perpendicular to the machining direction 32 of the power tool 14, essentially in the axial direction of the handle of the power tool 14, with its bottom region leading into a receptacle region 34 of the charger 24 (FIGS. 1 through 3). However, the replaceable rechargeable battery unit 10*a* may also be inserted in the unmounted state, without the power tool 14, into the receptacle region 34 for charging. In FIG. 2, a replaceable rechargeable battery unit 10*b* that is structurally identical to the replaceable rechargeable battery unit 10*a* is shown that is inserted into the receptacle region 34 without the power tool 14. To illustrate the fact that the replaceable rechargeable battery unit 10*b* could also be charged in the mounted state on the power tool 14 directly via the coupling unit 12*b*, the power tool 14 is shown only schematically in FIG. 2. For both replaceable rechargeable battery units 10*a*, 10*b*, the same reference numerals have been used, but followed by the letters "a" and "b" to distinguish them.

During the operation of the power tool 14, the coupling unit 12*a* is covered by a movably supported covering means 20*b*, formed by a slide, which upon insertion of the replaceable rechargeable battery unit 10*b* into the receptacle region 34 of the charger 24 comes to rest on a stop, not identified by reference numeral, of the charger 24, and is displaced by the insertion motion of the replaceable rechargeable battery unit 10*b* automatically into its release position in the direction of the power tool 14, counter to a spring element 46*b*, so that the coupling unit 12*b* can come into contact with a corresponding coupling unit 26 of the charger 24. Once the replaceable rechargeable battery unit 10*b* has been inserted jointly with the power tool 14 into the receptacle region 34, the handle of the power tool 14 is freely accessible, and so the replaceable rechargeable battery unit 10*b* can be conveniently pulled out of the charger 24 again, in that the power tool 14, being held by its handle, is pulled essentially in the axial direction of its handle out of the receptacle region 34 together with the replaceable rechargeable battery unit 10*b*. If the replaceable rechargeable battery unit 10*b* is inserted into the receptacle region 34 without the power tool 14, then it can either be grasped by its housing that protrudes past the charger 24 or advantageously by a contact plug 42*b* that protrudes past the housing and pulled out of the receptacle region 34.

On being pulled out, the covering means 20*b* is displaced by the spring element 46*b* back into its covering position, downward in the direction of the bottom region of the replaceable rechargeable battery unit 10*b*. Both in its covering position and in its release position, the covering means 20*b* is kept captive on the replaceable rechargeable battery unit 10*b*.

In addition or as an alternative to the coupling units 12*a*, 12*b*, the replaceable rechargeable battery units 10*a*, 10*b* may also each have a respective permanently covered coupling unit 50*a*, 50*b*, located for instance under the housing of the replaceable rechargeable battery units 10*a*, 10*b*, these coupling units being provided for contactless energy transmission and being suggested only by dashed lines in FIGS. 1 and 2.

LIST OF REFERENCE NUMERALS

10 Replaceable rechargeable battery unit for a power tool
12 Coupling unit
14 Power tool
16 Coupling unit
18 Tool receptacle region
20 Covering means
22 Covering means
24 Charger
26 Coupling unit
28 Coupling unit
30 Receptacle region
32 Machining direction
34 Receptacle region
36 Spring element
38 Receptacle region
40 Tool
42 Contact plug
44 Receptacle region
46 Spring element
48 Coupling unit
50 Coupling unit

The invention claimed is:

1. A power tool system, comprising:

a power tool;

at least one battery unit being rechargeable and replaceably connected to said power tool; and at least one coupling unit located on said power tool for charging said at least one battery unit while the at least one battery unit is being in at least one of a first charging state and a second charging state, in the first charging state the at least one battery unit being removed from the power tool during the charging, in the second charging state the at least one battery unit being replaceably connected to said power tool during the charging, wherein the at least one coupling unit remains directly accessible during the second charging state.

2. A power tool system according to claim 1, wherein said coupling unit is located on said battery unit.

3. A power tool system according to claim 1, wherein said coupling unit is located at the bottom of said battery unit.

4. A power tool system according to claim 1, wherein said coupling unit is located in a region toward a tool receptacle region.

5. A power tool system according to claim 1, wherein said coupling unit is located in a region oriented away from a tool receptacle region.

6. A power tool system according to claim 1, wherein said coupling unit is configured for contactless energy transmission.

7. A power tool system according to claim 1, further comprising covering means provided for covering said coupling unit.

8. A power tool system according to claim 7, wherein said covering means is supported movably.

9. A power tool system according to claim 7, wherein said covering means is kept captive in both its covering position and its release position.

10. A power tool system according to claim 8, wherein said covering means is configured for automatic motion into its release position upon a coupling operating to a charger.

11. A power tool system according to claim 1, further comprising a charger for connecting with said coupling unit for charging said battery unit.

12. A power tool system according to claim 11, wherein said charger is configured as a stand for said power tool.

13. A battery unit being rechargeable and replaceably connected to a power tool, comprising at least one coupling unit (12*a*) for charging said battery unit while said battery unit is being replaceably connected to the power tool, the at least one coupling unit (12*a*) remaining directly accessible while said battery is being charged.

14. A battery unit according to claim 13, wherein said coupling unit is located at the bottom of said battery unit.

15. A charger for charging at least one battery unit being rechargeable and replaceably connected to a power tool, comprising at least one first coupling unit (26, 28) for charging the battery unit, wherein the at least one battery unit has at least one second coupling unit (12*a*) making contact with the at least one first coupling unit and is being in at least one of a first charging state and a second charging state, in the first charging state the at least one battery unit being removed from the power tool while the at least one battery unit is being charged via the first coupling unit (26), in the second charging state the at least one battery unit being connected to the power tool while the at least one battery unit is being charged via the first coupling unit (28), and wherein the at least one second coupling unit (12*a*) remains directly accessible during the second charging state.

16. A charger according to claim 15, wherein said charger is configured as a stand for the power tool.

17. A charger according to claim 15, further comprising a receptacle region into which the power tool is positionable, at least essentially in a machining direction of said power tool.

18. A charger according to claim 15, further comprising a receptacle region for receiving the battery unit.

19. A power tool receiving a battery unit being rechargeable and replaceable, comprising:

a receptacle region for connecting to the battery unit; and a coupling unit (16) located on said power tool and provided for charging said battery unit, the coupling unit (16) remaining directly accessible while the battery unit is being charged by a charger having at least a first receptacle region (34) and a second receptacle region (30) and while the power tool is being received in the receptacle region (34).

20. A power tool according to claim 19, wherein the battery unit is being charged by the battery charger while the power tool is being received in the receptacle region (30).

* * * * *